Figure 3:
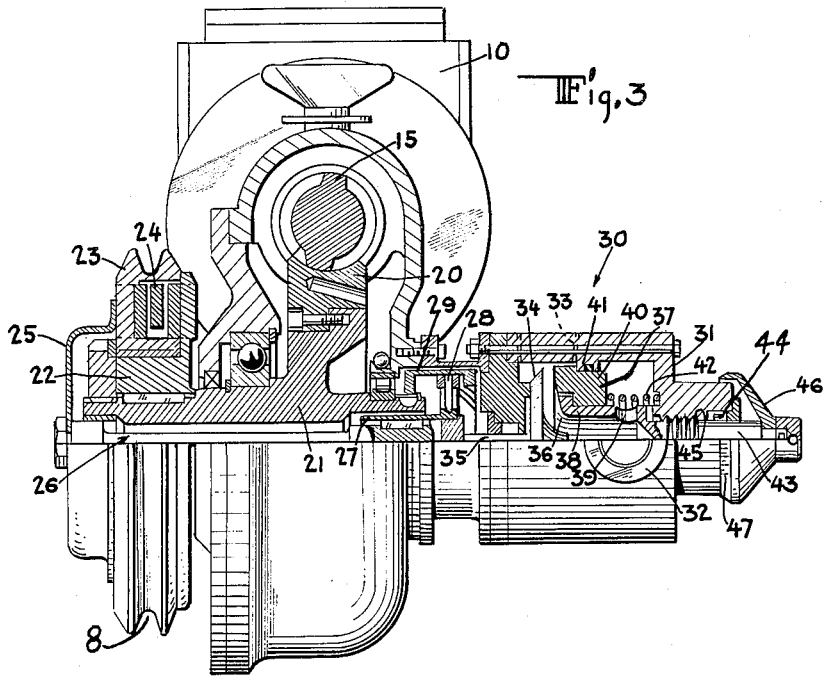

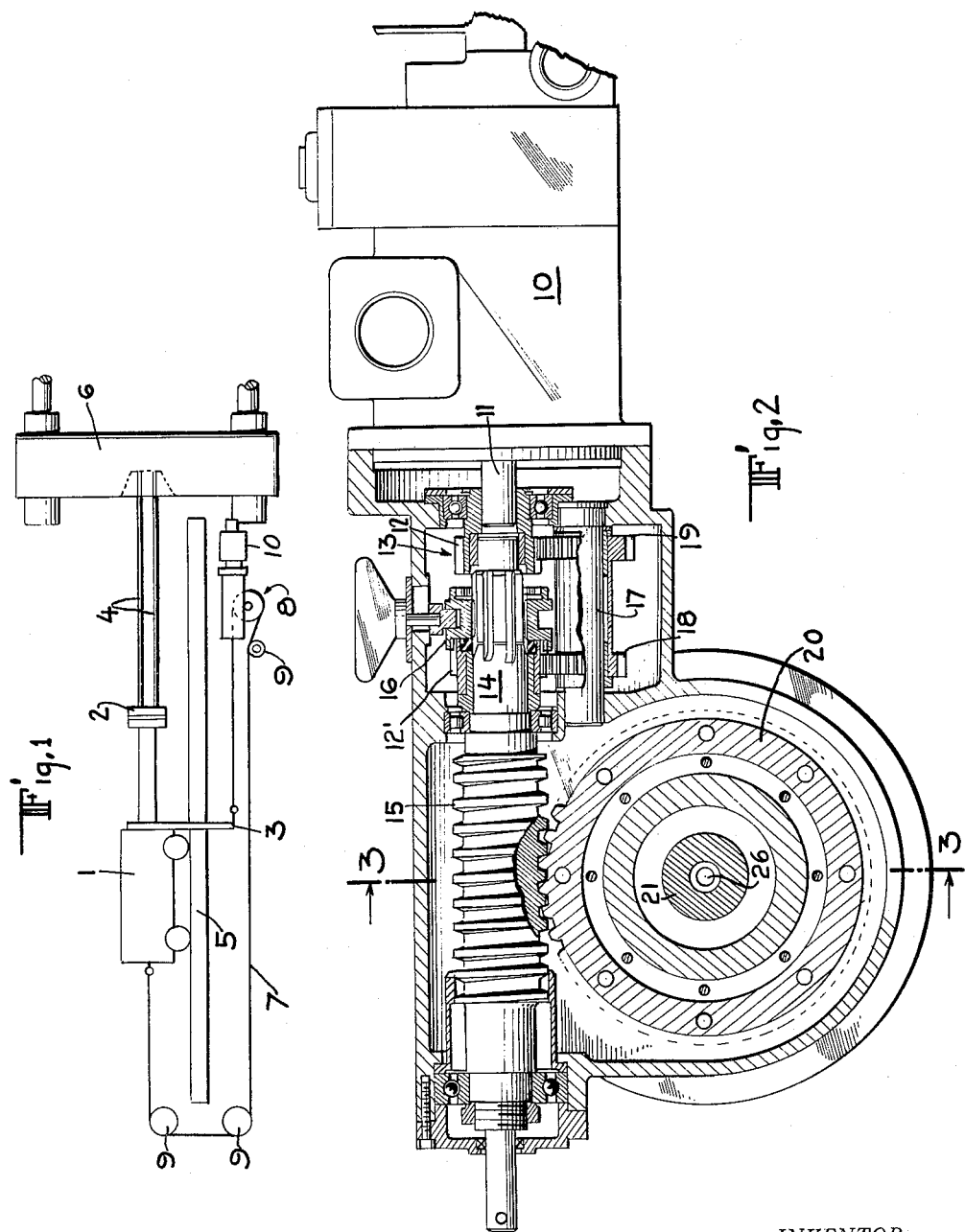

Sept. 26, 1961 R. F. WORLIDGE 3,001,764
PULL-OUT DEVICES FOR METAL EXTRUSION
PRESSES WITH TENSION CONTROL
Filed Jan. 13, 1958 2 Sheets-Sheet 2

INVENTOR.
Ronald Frederick Worlidge
BY
Hammond & Littell
ATTORNEYS

United States Patent Office 3,001,764
Patented Sept. 26, 1961

3,001,764
PULL-OUT DEVICES FOR METAL EXTRUSION PRESSES WITH TENSION CONTROL
Ronald Frederick Worlidge, Lower Parkstone, England, assignor to The Loewy Engineering Company Limited, Bournemouth, England, a corporation of Great Britain
Filed Jan. 13, 1958, Ser. No. 708,414
Claims priority, application Great Britain Jan. 22, 1957
5 Claims. (Cl. 254—172)

This invention relates to mechanical pull-out devices for metal extrusion presses. These devices are arranged at the discharge end of an extrusion press and operate to receive and engage the leading end of an extruded rod when it emerges from the press, and to travel away from the press with the extruded rod firmly secured to them. These pull-out devices make it unnecessary to employ manual labour for handling the extruded rods upon their discharge from the press, which was formerly the general custom, and they improve also the properties of the extruded rods inasmuch as they straighten them to a certain extent.

These pull-out devices have additional advantages when used in connection with presses in which a number of rods are simultaneously extruded in parallel strands through a multi-hole die. There, the use of pull-out devices ensures not only that the simultaneously extruded strands are kept apart from each other during their movement away from the press, without becoming entangled with each other, but also that these strands travel at the same speed, so that they will be all of equal length.

It is an essential condition in these pulling devices that the tension exerted by them on the extruded rods remains substantially constant, or at least within predetermined limits. An excess of tension would lead to the rods being over-stretched, or to their breaking. Insufficient tension would make the device of ineffective for attainment of any of the above-mentioned objectives.

Mechanical pull-out devices for metal extrusion presses consist of a carriage and a pulling head mounted thereon. The carriage is adapted to travel towards and away from the press in the direction of the discharge of the extruded rods. To this end, the carriage in known pull-out devices is attached to a cable or rope which is wound over a power-driven pulley. The drive for the pulley may be reversible, so that it can be used for moving the carriage in both directions, with the return movement being preferably carried out at a higher speed.

The speeds at which the rods are extruded from a press depends on a number of factors, such as the extrusion ratio, the shape of the rods, and also on certain properties of the extruded metal. There is a definite optimum speed or speed range which takes these factors into account, and this is the speed or speed range which is generally selected for the operation of the press. However, in actual practice, the speed at which extruded rods are discharged from the press does not remain constant, and varies not only from one billet to another, but also during the extrusion of a single billet.

The motors available for the drive of a pull-out device have generally a speed-torque characteristic, according to which the torque developed by the motor, hereafter called "the output torque," increases with a decrease in motor speed. A motor of this type, if used for the drive of a pull-out device for an extrusion press, would operate in a manner which leads to unsatisfactory conditions whenever the extrusion speed fluctuates. If the actual speed of the extruded rods drops below the selected speed of extrusion, even momentarily, then the output torque of the motor and the tension in the rods will tend to increase, which, for the reasons stated above, may lead to detrimental consequences. If, on the other hand, the actual speed of the extruded rods exceeds the selected speed of extrusion, then the output torque will tend to drop and therefore also the tension in the rods, so that the pull-out device will become less effective.

It has therefore been proposed to provide, in the drive of pull-out devices, a control mechanism which keeps the tension in the extruded rods substantially constant, irrespective of fluctuations in the speed of the extruded rods.

According to one proposal, a displaceable spring-loaded element is incorporated into the drive for the carriage of a pull-out device, the arrangement being such that the displacement of the element under tension load corresponds to the difference between the actual extrusion speed and the selected speed. Movement of this element is effective to actuate means for controlling the output torque of the driving motor in such a manner that this torque remains substantially constant, or at least within acceptable limits, irrespective of any variations in the speed of the extruded rods.

In known mechanical pull-out devices, the drive of the pulley for the cable is effected by an electric motor. Electric motors, however, have been found unsuitable for this purpose as they require complicated control circuits, and may also have to be of a special type. They are further apt to develop excessive heat, and are uneconomical at low speeds.

It is an object of the present invention to provide a mechanical pull-out device for a metal extrusion press of the type having automatic tension control means for its drive, and in which these control means are of improved design.

It is another object of the present invention to provide a mechanical pull-out device for metal extrusion presses having a driving motor with certain characteristics which make it particularly suitable for the special requirements of such a device.

According to the present invention, there is provided a pull-out device for metal extrusion presses with automatic tension control having a rotary torque transmission unit coupled to and adapted to transmit drive from a variable torque motor to a pulling-head, said unit comprising an elastic rotary coupling having a driving half connected to the motor and a driven half connected to the pulling-head or driven member, an elastic member connecting the two coupling halves to each other and means associated with each of said coupling halves, whereby relative rotary motion between said coupling halves is transmitted to a device for controlling the output torque of said driving motor.

According to a further feature of the invention, the rotary coupling is built into a pulley which drives a flexible member attached to the pulling-head, the driving half of said coupling being formed by the hub portion of said pulley, and the driven half of said coupling being formed by the rim portion of said pulley, or vice versa.

Preferably, the variable torque motor is a compressed air motor whose output torque is controlled by a closure device for its throttle valve.

The term "extruded rod or rods" is to be interpreted here as including an extruded article of any shape, irrespective of whether it is solid or hollow.

Figure 4:
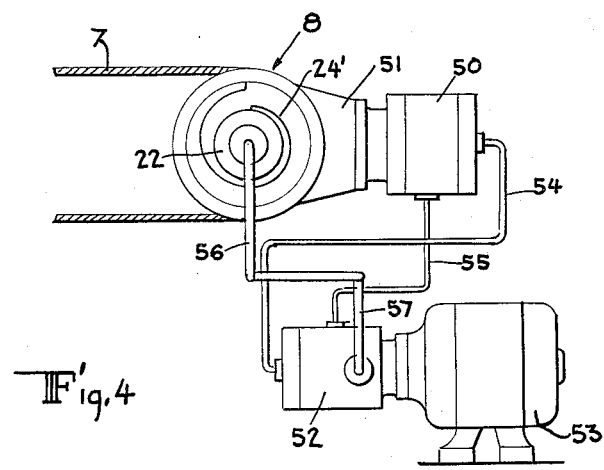

For a better understanding of the invention and to show how it may be carried into effect, the same will now be described with reference to the accompanying drawings, wherein:

FIGURE 1 is a schematic view of a pull-out device according to the present invention, FIGURE 2 is a sectional view to a larger scale of part of the pull-out device shown in FIGURE 1, FIGURE 3 is a transverse section taken on the line 3—3 of FIGURE 2, and FIGURE 4 is a schematic view of a modification of the invention.

Throughout the drawings like parts have been indicated by like reference numerals.

As shown in FIGURE 1, the pull-out device itself comprises a carriage 1 and a pulling head 2 mounted thereon. The pulling head is provided with one or more sets of clamping members adapted to engage the leading end of the extruded rods 4. The number of clamping members depends on the number of rods to be extruded simultaneously from the press. The carriage in the pulling head may be of the design described in my co-pending British application No. 17232/57 (P–2321–H), filed January 22, 1957, now Patent No. 837,623, or of any other suitable design.

The carriage is adapted to travel along a runway 5 arranged at the rear of the press 6 and extending in the direction of discharge of the extruded rods. Attached to an arm 3 depending from one end of the carriage is a cable 7 which passes round a pulley 8 and leads back to the opposite extremity of the carriage, so that the latter can be moved in opposite directions along its runway by the cable, the pulley having to this end a reversible drive, which will be described in detail below. Idle rollers 9 are provided at suitable points for guiding the cable 7.

FIGURE 2 illustrates the driver member including the pulley 8 and a reversible motor 10, whose operating medium is compressed air, the motor being of the rotary vane type. Mounted on the output shaft 11 of this motor is a gear wheel 12, another gear wheel 12′, running loosely on splined input shaft 14, forms part of a two speed reduction gear 13. This includes a splined input shaft 14, combined with a worm gear 15, a toothed wheel 16 provided with two sets of internally projecting teeth which is axially slideable along said splined shaft 14 to select the gear ratio required, and a lay shaft 17 provided at opposite extremities with reduction gear wheels 18, 19. In operation gear wheel 12 drives gear wheel 19 which in turn is connected to gear wheel 18 meshing with gear wheel 12′ to drive gear wheel 12′, so that both gear wheels 12 and 12′ are continuously rotated. To select one gear ratio wheel 16 is shifted to connect gear 12 with splined shaft 14 and to select another gear ratio wheel 16 is shifted to disconnect gear 12 from splined shaft 14 and to connect gear 12′ with splined shaft 14. The slow speed of the gear through the lay shaft 17 is used for moving the carriage away from the press, with extruded rods clamped thereto, and the fast direct drive for returning the carriage to its initial position after an extrusion operation has been terminated. In the case of the return motion, the drive of the motor 10 is, of course, reversed.

As shown in FIGURE 3, the worm gear 15 meshes with a pinion 20 formed integrally with a hollow transmission shaft 21. At one end the shaft is keyed to an annular hub member 22 forming part of the cable pulley 8 for the movable carriage. Circumscribing the hub member is a rim member 23, both members being interconnected by a spiral torsion spring 24 to form the complete pulley unit; the spring is accommodated in an internal space between both members in the manner shown. During normal operation of the device, the torque is transmitted from the hub member 22 through the spring 24 to the rim member 23, structural elements 22, 23 and 24 defining an "overrunning" coupling, with no relative movement between the two members so long as the load conditions are stable. If, however, due to fluctuations in the speed of discharge of the extruded rods, the restraining force exerted by the rods on the pull-out device is changed, and thereby also the load on the rim member 23, then the latter will either lag behind or over-run the hub member 22 until stable conditions have been re-established.

Drivably connected to the rim member 23 by a disc-shaped element 25 is a spindle 26 which is co-axial with the transmission shaft 21 and passes through its interior. Any relative angular movement between the hub and rim members results, therefore, in a corresponding relative rotation between spindle 26 and shaft 21. An axially slidable member, in the form of a sleeve 27, is keyed to one end of the spindle and carries one or more followers 28 in engagement with a helical cam track formed on the internal periphery of an annular extension 29 of the shaft 21. By this connecting mechanism, any relative rotation between the hub and rim members 22, 23 will cause the sleeve 27 to move axially along the spindle 26. Sliding movement of the sleeve is used to actuate a mechanism which controls the torque output of the air motor 10.

The control mechanism for the air motor includes a throttle valve unit generally designated by the numeral 30 which is arranged in the line of supply of compressed air for the motor. The setting of this unit determines the air pressure and thereby also the output torque of the motor 10.

As shown, the throttle valve unit is arranged on the same axis as the spindle 26 and sleeve 27. It comprises a casing 31 provided with an inlet port 32 and an outlet port 33, as indicated by the chain lines, said output port leading to the air motor 10. Within the casing is mounted an axially adjustable valve member 34 having a stem 35, which during operation of the unit bears against the end of the sleeve 27 under the pressure of air within a pressure chamber 36. An axially displaceable closure device 37 is arranged in aligned relationship with the valve member, and is formed in two parts constituted by a tubular inner portion 38 provided with pressure ports 39 and an outer portion 40 circumscribing said inner portion in the manner shown. Movement of the device 37 in a direction away from the valve member 34 is limited by means of stop 41 projecting inwardly from the inner surface of the casing 31 to abut a stepped portion of the outer portion 40. A coiled compression spring 42 is arranged about the inner portion 38 of the closure device with its opposite ends engaging respectively the end face of the casing 31 and a side wall of the outer portion 40. The spring 42 urges the closure device towards the valve member 34 and therefore the closed position. During operation of the valve unit, however, the pressure of the spring is balanced by that of the air in the pressure chamber 36, whereupon the valve member and closure device adopt their operating positions substantially, as shown.

The closure device 37 is manually adjustable and to this end the inner portion 38 is provided with a screw-threaded shaft 43 leading outwardly of the casing 31 at an air seal 44 and inter-acting with a complementary screw-threaded portion 45 of said casing. As shown, a hand adjustment knob 46 is fitted to the protruding portion of the shaft 43. Rotation of the knob 46 thus causes the closure device to move towards or away from the valve member, whereby the valve opening may be pre-set, and, thereby, also the air pressure and the output torque characteristic of the motor 10, so that the tension in the cable at a given motor speed can be determined in advance. The knob 46 is provided with calibrations 47 whereby the tension of the pull-out device can be adjusted and adapted to individual requirements.

The arrangement of the valve unit is such that axial movement of the sleeve 27 caused by relative rotation of the shaft 21 and spindle 26, due to the rim member 23 lagging behind the hub member 22, will lead to the valve opening being reduced so that the output torque of the motor 10 is diminished. Thus, an increase in the drag on the pulling head due to a slowing-down of the speed of discharge of the extruded material, leads automatically to a reduction in the output torque. Conversely, an increase in that speed leads to a reversed direction of rotation between the shaft 21 and spindle 26, and thereby to an increase in valve opening and thereby the output torque. In this way, the tension applied by the pull-out device to the extruded rods will remain substantially constant, or at any rate, within close limits. In practice these limits will not exceed 10%.

The air motor 10 is so dimensioned that, with the throttle valve fully opened, the speed imparted by the motor to the pulley substantially exceeds the maximum speed at which extruded material is discharged from the press under any conditions at which the press is operated in practice. The actual speed of the extruded articles is therefore always within the limits which can be adjusted by the movement of the throttle valve.

If desired, a separate pressure-regulating valve (not shown) may be provided for effecting small variations in the output torque, in addition to the automatically controlled throttle valve. This separate valve may be arranged at a point remote from the motor driven device.

Manual adjustment of the throttle valve may be effected through remote control from the control pulpit of the press.

The above-described drive unit and the automatic control means are capable of various modifications in detail. For example, the spring between the hub and rim members may be either a tension or a compression spring. The helical cam track may be formed on the axially displaceable sleeve and the followers on the hollow transmission shaft of the worm gear. Means other than spiral cams may alternatively be used for transforming the relative rotation between spindle and hollow shaft into a sliding movement, such as a nut and a threaded spindle, or a rack and pinion.

In the case of the driving motor for the pulley not being an air motor, different automatic control means will be provided, the nature of these control means depending on the type of motor used.

FIGURE 4 shows an example of a modified motor drive and control means therefor. In this case the pulley 24′ is driven by a constant displacement hydraulic motor 50 through the intermediary of a reduction gear 51. A variable delivery pump 52 driven from an electric motor 53 circulates hydraulic fluid to said motor 50 through a pressure pipe 54, the return flow being fed back to the variable delivery pump via a return pipe 55. A toggle linkage 56 is arranged in operative relationship with the pulley so that relative rotation of the hub and rim members due to fluctations in the speed of discharge of the extruded rods, causes said toggle mechanism to modify the setting of the variable delivery pump 52 through the intermediary of a pump control lever 57. This in its turn will vary the speed of the constant displacement motor 50 to modify the torque applied to the pulley as required. As in the case of the air motor drive of the previous example, the arrangement is such that an increase in the drag on the pulling head due to a slowing-down of the speed of the extruded material, leads automatically to a reduction in the output torque. Conversely, an increase in that speed leads to an increase in the output torque.

What we claim is:

1. An automatic pulling mechanism for drawing with substantially constant unidirectional force and with fluctuating speed, and comprising a driven member moving in one direction with fluctuating speed, a driver member for pulling said driven member in one said direction and including a pulley, and a linking member secured to said driven member and received by said pulley for connecting said driven and driver members; said driver member comprising a motor having a power output which varies inversely with the speed thereof and a hub driven by said motor, said motor being provided with a throttle mechanism in the power supply thereto, an overrunning coupling provided between said hub and said pulley, said overrunning coupling including a spring respectively secured to said pulley and to said hub to transmit power from said motor to said pulley and provide limited overrun between said hub and said pulley in accordance with the difference between said fluctuating speed which is transmitted through said linking member and said speed of said motor, and connecting mechanism linking said overrunning coupling and said throttle mechanism to operate said throttle mechanism and to vary said power output of said motor in direct proportion with the direction and magnitude of the overrun between said hub and said pulley thereby providing substantially constant pulling force in the pulling mechanism irrespective of the speed of said motor.

2. A mechanism constructed in accordance with claim 1, wherein said motor is reversible and wherein said driver member further comprises a reduction gear mechanism between said motor and said hub to drive said hub at different speeds depending upon the direction in which said motor is driven; said motor when driven in one direction moving said driven member in one direction to pull the said driven member unidirectionally with fluctuating speed, said reduction gear mechanism being operative when said motor is driven in the opposite direction to move said driven member in another direction and with higher speed.

3. A mechanism constructed in accordance with claim 1, wherein said connecting mechanism comprises a spindle attached for common rotation with said pulley, a hollow transmission shaft attached for common rotation with said hub, an axially displaceable sleeve carried by said spindle, and a cam and follower mechanism provided on said sleeve and on said transmission shaft for transforming said overrun movement between said hub and said pulley into corresponding axial displacement of said sleeve, said sleeve being coupled to said throttle mechanism to move the latter upon movement of said sleeve and correspondingly vary the power supply to said motor to control said motor.

4. An automatic constant tension drive mechanism subjected to fluctuating speed and comprising a driven member moving with fluctuating speed, a driver member for pulling said driven member and including a pulley, and a linking member secured to said driven member and received by said pulley for connecting said driven and driver members; said driver member comprising a motor having a power output which varies inversely with the speed thereof and a hub driven by said motor, an overrunning coupling provided between said hub and said pulley, said overrunning coupling including a spring respectively secured to said pulley and to said hub to transmit power from said motor to said pulley and provide limited overrun between said hub and said pulley in accordance with the difference between said fluctuating speed which is transmitted through said linking member and said speed of said motor, and connecting mechanism provided between said overrunning coupling and said motor to vary said power output of said motor in direct proportion with the direction and magnitude of the overrun between said hub and said pulley thereby providing substantially constant tension in the drive mechanism, said connecting mechanism comprising a spindle attached for common rotation with said pulley, a hollow transmission shaft attached for common rotation with said hub, an axially displaceable sleeve carried by said spindle, and a cam and follower mechanism provided on said sleeve and on said transmission shaft for transforming said overrun movement between said hub and said pulley into corresponding axial displacement of said sleeve, said motor being further provided with a throttle valve in the power supply thereto, said sleeve being linked to said throttle valve for moving the latter upon movement of said sleeve to thereby correspondingly control said power output of said motor.

5. An automatic constant tension drive mechanism subjected to a fluctuating speed and comprising a driven member subjected to said fluctuating speed, a driver member for pulling said driven member and including a pulley, and a linking member secured to said driven member and received by said pulley for connecting said driven and driver members; said driver member comprising a motor having a power output which varies inversely with the speed thereof and a hub driven by said motor, a coupling assembly provided between said hub and said pulley, said coupling assembly including an elastic member having its ends respectively secured to said hub and to said pulley to transmit power from said motor to said pulley and provide differential movement between said hub and said pulley in accordance with the difference between said fluctuating speed transmitted through said linking member and said speed of said motor, and connecting mechanism provided between said coupling assembly and said motor to vary said power output of said motor in direct proportion with the direction and magnitude of said differential movement between said hub and said pulley thereby providing substantially constant tension in the drive mechanism, said connecting mechanism comprising a spindle attached for common rotation with said pulley, a hollow transmission shaft attached for common rotation with said hub, an axially displaceable sleeve carried by said spindle, and a cam and follower mechanism provided between said sleeve and said transmission shaft for transforming said differential movement between said hub and said pulley into corresponding axial displacement of said sleeve, said motor being further provided with a throttle valve in the power supply thereto, said sleeve being linked to said throttle valve for moving the latter upon movement of said sleeve to thereby correspondingly control said power output of said motor.

References Cited in the file of this patent
UNITED STATES PATENTS

| | | |
|---|---|---|
| 396,430 | Reichel | Jan. 22, 1889 |
| 1,804,945 | Miller | May 12, 1931 |
| 2,332,069 | Gettig | Oct. 19, 1943 |
| 2,402,789 | Tweedale | June 25, 1946 |
| 2,582,987 | Hagenbook | Jan. 22, 1952 |
| 2,720,310 | Yack et al. | Oct. 11, 1955 |
| 2,771,268 | Rosewall | Nov. 20, 1956 |

FOREIGN PATENTS

| | | |
|---|---|---|
| 284,085 | Great Britain | Jan. 26, 1928 |